United States Patent
Dahlem

(10) Patent No.: US 9,920,692 B2
(45) Date of Patent: Mar. 20, 2018

(54) COOLING SYSTEMS AND METHODS USING PRESSURIZED FUEL

(71) Applicant: Distributed Storage Technologies LLC, Avon, CT (US)

(72) Inventor: David F. Dahlem, Avon, CT (US)

(73) Assignee: DISTRIBUTED STORAGE TECHNOLOGIES LLC, Avon, CT (US)

( * ) Notice: Subject to any disclaimer, the term of this patent is extended or adjusted under 35 U.S.C. 154(b) by 438 days.

(21) Appl. No.: 14/291,427

(22) Filed: May 30, 2014

(65) Prior Publication Data

US 2015/0345394 A1    Dec. 3, 2015

(51) Int. Cl.
| | |
|---|---|
| F02C 7/14 | (2006.01) |
| F02C 7/12 | (2006.01) |
| F23R 3/10 | (2006.01) |
| F23R 3/28 | (2006.01) |
| F02C 7/143 | (2006.01) |
| F02C 7/224 | (2006.01) |

(52) U.S. Cl.
CPC ............... *F02C 7/14* (2013.01); *F02C 7/12* (2013.01); *F02C 7/143* (2013.01); *F02C 7/224* (2013.01); *F23R 3/10* (2013.01); *F23R 3/28* (2013.01)

(58) Field of Classification Search
CPC .... F02C 7/12; F02C 7/14; F02C 7/224; F05D 2260/20
USPC .................................................. 60/806, 736
See application file for complete search history.

(56) References Cited

U.S. PATENT DOCUMENTS

| | | | |
|---|---|---|---|
| 4,849,648 A | 7/1989 | Longardner | |
| 5,161,365 A * | 11/1992 | Wright | F02C 7/16 60/39.461 |
| 5,457,951 A | 10/1995 | Johnson et al. | |
| 5,461,882 A * | 10/1995 | Zywiak | B60H 1/00007 62/401 |
| 5,537,822 A | 7/1996 | Shnaid et al. | |
| 6,089,012 A * | 7/2000 | Sugishita | F01K 23/106 60/39.182 |
| 6,167,692 B1 * | 1/2001 | Anand | F02C 1/00 60/39.12 |
| 6,253,554 B1 * | 7/2001 | Kobayashi | F02C 7/12 60/736 |
| 6,381,973 B1 | 5/2002 | Bhatti et al. | |
| 6,438,994 B1 * | 8/2002 | Rashad | F25B 9/006 62/613 |
| 6,449,983 B2 | 9/2002 | Pozivil | |
| 6,467,273 B1 | 10/2002 | Lott et al. | |

(Continued)

OTHER PUBLICATIONS

A. P.P. dos Santos et al., "Comparison of Different Gas Turbine Inlet Air Cooling Methods." World Academy of Science, Engineering and Technology, vol. 61, pp. 40-45, 2012.

(Continued)

*Primary Examiner* — Steven Sutherland
(74) *Attorney, Agent, or Firm* — Blank Rome LLP

(57) ABSTRACT

Provided are systems and methods for cooling to increase efficiency in power-generation facilities, to cool various other apparatus including buildings, and/or to generate water, including, but not limited to, systems for increasing the efficiency of power-generating turbines via inlet-cooling, optionally by expanding a portion of a pressurized fuel source that also feeds the turbine.

23 Claims, 2 Drawing Sheets

| | |
|---|---|
| 1 Flow Control Valve | 140 Conduit |
| 2 Automated Control System | 150 Expander |
| 105 Wind farm Energy Source | 160 Expanded Gas Stream |
| 107 Gas stream | 170 Heat Exchanger |
| 108 Compressor | 171 Second Liquid or Gas Stream |
| 109C Water Sorage Facility | 191 Precipitation Stream |
| 110 Pressurized Gas Source | 193 Cooling Stream |

(56) References Cited

U.S. PATENT DOCUMENTS

| | | | |
|---|---|---|---|
| 6,840,709 | B2 | 1/2005 | Dahlem et al. |
| 6,915,657 | B1 * | 7/2005 | Wood ................... F25D 11/022 |
| | | | 62/371 |
| 7,600,396 | B2 | 10/2009 | Mak |
| 8,015,808 | B2 | 9/2011 | Keefer et al. |
| 8,020,406 | B2 | 9/2011 | Vandor et al. |
| 8,117,852 | B2 | 2/2012 | Mak |
| 8,136,740 | B2 | 3/2012 | Hagen et al. |
| 8,450,884 | B2 | 5/2013 | Stahlkopf et al. |
| 2005/0028529 | A1 * | 2/2005 | Bartlett .............. B01D 53/1475 |
| | | | 60/772 |
| 2007/0062194 | A1 | 3/2007 | Ingersoll |
| 2008/0184735 | A1 | 8/2008 | van Wijngaarden et al. |
| 2010/0095681 | A1 | 4/2010 | Enis et al. |
| 2011/0233940 | A1 | 9/2011 | Aoyama et al. |
| 2013/0091853 | A1 * | 4/2013 | Denton ................... F02C 1/007 |
| | | | 60/772 |

OTHER PUBLICATIONS

J.S. Andrepont, "Cool Your Jets! Thermal Energy Storage Technologies for Turbine Inlet Cooling." ENERGY-TECH.com, pp. 18-19, Aug. 2004.

D. Punwani, "Cool Your Jets! Chiller Technologies for Turbine Inlet Cooling (Part 2)." Energy-Tech, pp. 1-3, Jun. 2004.

GE Oil & Gas, "Turboexpander-Compressors, Increased Efficiency for Refrigeration Applications." 2010.

\* cited by examiner

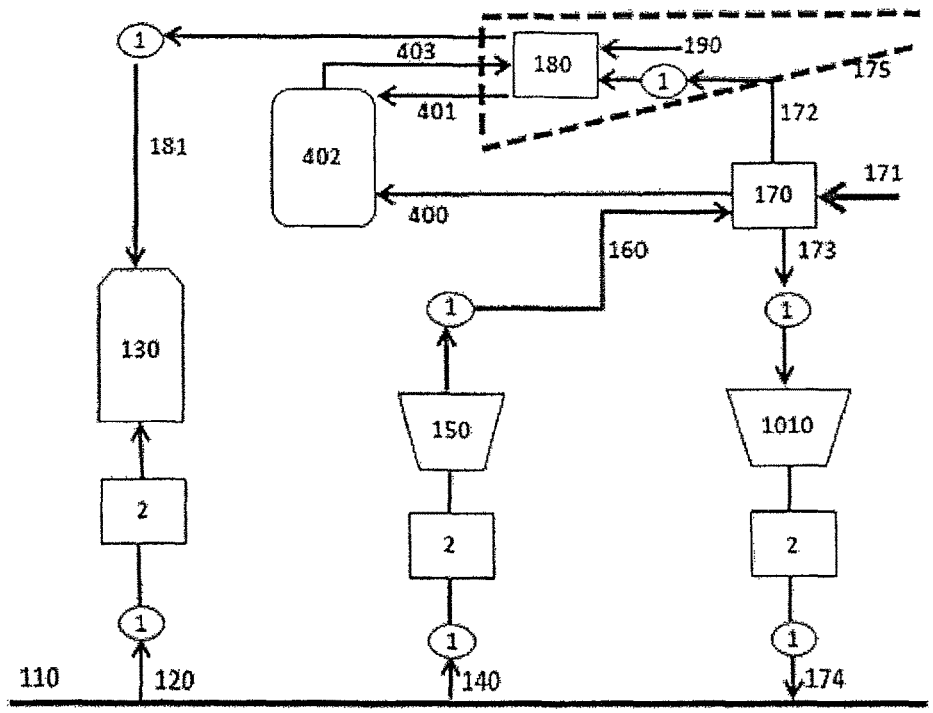

Figure 1

| 1 | Flow control valve | 173 | Expanded gas stream |
| 2 | Automated Control System | 174 | Compressed Return Gas Stream |
| 110 | Pressurized Gas Source | 175 | Conduit System |
| 120 | Pressurized Fuel Stream | 180 | Air-mixing Unit |
| 130 | Power Generating Facility | 181 | Chilled Inlet-cooling Fluid Stream |
| 140 | Conduit | 190 | Air Stream |
| 150 | Expander | 402 | Water Storage Facility |
| 160 | Expanded Gas Stream | 403 | Fresh Water Stream |
| 170 | Heat Exchanger | 401 | Fresh Water Stream |
| 171 | Second Liquid or Gas Stream | 400 | Fresh Water Stream |
| 172 | Chilled Gas or Fluid Stream | 1010 | Compressor |

| | |
|---|---|
| 1 Flow Control Valve | 140 Conduit |
| 2 Automated Control System | 150 Expander |
| 105 Wind farm Energy Source | 160 Expanded Gas Stream |
| 107 Gas stream | 170 Heat Exchanger |
| 108 Compressor | 171 Second Liquid or Gas Stream |
| 109C Water Sorage Facility | 191 Precipitation Stream |
| 110 Pressurized Gas Source | 193 Cooling Stream |

COOLING SYSTEMS AND METHODS USING PRESSURIZED FUEL

FIELD

The present disclosure relates to cooling systems and methods for increasing the efficiency of power-generating devices via turbine inlet-cooling. In one aspect the disclosure relates to systems for cooling an apparatus and also generating water, optionally using a pressurized fuel source that feeds a fuel-fired power-generating turbine.

BACKGROUND

Energy supply, demand and delivery infrastructure systems present current and growing societal issues with emphasis on low cost, efficient and environmentally sensitive solutions. The energy industry, regulatory groups, and government agencies seek to provide safe, efficient and affordable energy to consumers. In the wake of digital and electronic device ubiquity, population growth, industry, and personal comfort concerns, energy demand is rising sharply.

For example, in Texas, summer daytime energy demands can frequently exceed the International Organization for Standardization's (ISO) rated capacity for power-generators. This is due to the high temperatures and resulting increased demands from air-conditioners and other devices, as well as a decrease in energy production efficiency. An independent system operator (the Electric Reliability Council of Texas (ERCOT)) manages the flow of electricity in Texas and is one of nine such system operators within the United States. ERCOT has implemented measures to increase the variable system-wide offer cap (SWOC) to $7,000/MWh in June, 2014, and to $9,000/MWh in June, 2015, in an attempt to attract development of new generation. To date, however, this has not succeeded. Regulators and the energy industry have undertaken a variety of other measures to reduce peak daytime energy demands, such as campaigns to encourage less electricity use and optimization of existing generation and delivery infrastructure systems.

One potential efficiency-enhancing measure is inlet-cooling of power-generating devices, such as fuel-fired power-generating turbines. Inlet-cooling refers to the cooling of, for example, air fed to a turbine to lower the temperature of the overall inlet air ("turbine inlet-cooling" or "TIC"). Power-generation efficiency also depends on the mass flow rate of the air to the turbine. An increase in temperature decreases the mass flow rate, because gas density decreases when the temperature increases, as demonstrated by the Ideal Gas Law. An increase in ambient air temperature, such as in the summer, during peak production hours, decreases the power-generation of combustion turbines. Inlet-cooling increases both the air density and the mass flow rate of air to the turbine and, thus, increases the power output. The power output of all combustion turbines decreases as the inlet air temperature increases.

The ISO-rated capacities of combustion turbines are based on standard ambient air conditions of 59° F. and 14.7 psia at sea level. An increase in inlet air temperature from 59° F. to 100° F., such as on a hot summer day, decreases power output of a combustion turbine to about 73% of its ISO-rated capacity. This can lead to a loss of opportunity for power producers to sell more power, just when the rise in ambient temperature increases power demand. Cooling the inlet air from 100° F. to 59° F. prevents loss of 27% of the ISO-rated generation capacity. Cooling the inlet air further, to about 42° F., enhances the power-generation capacity to 110% of the ISO-rated capacity. Therefore, cooling the inlet air from 100° F. to 42° F. can increase the output capacity by about 50%.

However, the need to refrigerate a cooling medium, such as ambient air, to the temperatures desired for inlet-cooling can also reduce the overall increase in power achievable by inlet-cooling. Such refrigeration is typically performed in the same hot, ambient conditions as exemplified above. Conventional systems for inlet-cooling employ water or air-coolers, such as cooling towers, evaporative coolers, and/or absorption chillers, which require relatively high energy inputs in order to refrigerate the inlet-cooling medium.

Evaporative cooling uses the heat of ambient air to evaporate water, taking with it a high latent heat of vaporization, thus cooling the air. The inlet temperatures that evaporative cooling can achieve are significantly limited by the difference between the dry bulb temperature and the wet bulb temperature. Evaporative cooling also requires large amounts of water. In 2005, it was estimated that about 41% of all fresh water in the United States is used for cooling power-generating facilities. The current need for increasing power-generation while conserving natural resources cannot support this ongoing practice. The issue is a focus of the U.S. Environmental Protection Agency (EPA), which recently established new guidelines on the use of fresh water within the power-generation sector.

Absorption cooling, another system for inlet-cooling, operates similarly to conventional compression coolers (air conditioners) in that a refrigerant with a low boiling point is evaporated, using the heat removed from the medium to be cooled. Absorption cooling provides a liquid into which the gaseous refrigerant is absorbed. A heater is subsequently used to separate the refrigerant from the liquid medium. Absorption cooling is limited by the need for environmentally-friendly coolants with sufficient heat transfer and vaporization properties. Additionally, absorption systems are complex and expensive. The power required to operate such systems is estimated to be about 0.28/kW/RT (refrigerated ton).

Alternatively, thermal energy storage ("TES") is a system which creates chilled water and/or ice pools using low priced electricity during off-peak hours. The coolants can then be used for TIC purposes during times of peak energy demand. Disadvantages of TES are the need for off-peak power to create the ice or chill the water, in addition to large storage volumes to retain the water/ice media, and to sustain the temperature for use during peak times.

Thus, the best known TIC systems include relatively high capital cost, energy input requirements, reliance on fresh water, and inability to effectively operate during peak times without also requiring resources during times of off-peak energy demand.

SUMMARY

New systems and methods are needed to provide cooling without the detriments or limitations of the above systems. New power-plant construction to meet peak day power demands is expensive and inefficient to society, in terms of capital and environmental costs. Aspects of the present disclosure facilitate the efficient use of resources. Aspects of the present disclosure also can utilize existing delivery/infrastructure systems and generate fresh water, as compared to building new, capital-intensive power-generating plants or requiring additional water-consuming equipment.

As described herein, an apparatus to be cooled may comprise, for example, a turbine or turbine inlet, a power-generation facility, a system of turbines, a ventilation or air conditioning system such as for a building, a conduit, or any other material, structure, or device for which cooling is desired.

As used herein, the terms "chilled," "chilling" and "cooling effect" relate to reducing the temperature of an apparatus or material, for example a liquid, gas, or gas inlet, by bringing the apparatus or material into thermal contact with a relatively lower temperature material, for example, with a relatively lower temperature gas or liquid, such as in a heat exchange system or a mixing unit. When relatively warm and cool materials or streams are placed in thermal contact, each proceeds towards thermal equilibrium. A chilling or cooling effect as described herein may be applied directly to chill an apparatus or stream, or may be transferred to one or more subsequent liquids, gases, or materials, before applying the cooling effect to the end use gas, fluid, or apparatus, such as turbine inlet, desired to be cooled.

In one aspect, the present disclosure provides a system for cooling an apparatus and/or generating water, the system comprising: a source of pressurized gas; an expander in fluid communication with the pressurized gas source and configured to expand at least a portion of the pressurized gas to provide a cooled gas; a heat exchanger in thermal contact with the cooled gas and configured to place the cooled gas in thermal contact with a second gas or fluid to provide a chilled second gas or fluid; and optionally a conduit configured to transport the chilled second gas or fluid to an apparatus to be cooled.

In another aspect of the present disclosure the chilled second gas or fluid comprises air. The air may further comprise water vapor. In one aspect of the present disclosure the system further comprises a conduit or a container adapted to collect condensed water as it precipitates from the air.

In another aspect of the present disclosure the system further comprises a compressor configured to recompress at least a portion of the expanded gas after passage through the heat exchanger. In a preferred embodiment, the chilled second gas or fluid is chilled to at or below 59 degrees Fahrenheit.

In another aspect, the apparatus to be cooled comprises a ventilation or air conditioning system of a building. In another aspect, the apparatus to be cooled comprises a power-generating turbine. The turbine may be fueled by gas from the pressurized gas source.

In another aspect of the present disclosure the pressurized gas source comprises at least one of a gas pipeline, a gas storage tank, and a well bore.

In another aspect of the present disclosure the pressurized gas is natural gas.

In yet another aspect, the heat exchanger comprises at least one of an air house, an absorption chiller, and a cooling tower.

In another aspect, the system further comprises at least one of an evaporative cooler and absorption cooler in thermal contact with at least one of the second gas or fluid and the chilled second gas or fluid.

In another aspect of the present disclosure, the system comprises an air-mixing unit configured to mix the chilled second gas or fluid with ambient air. In a further aspect of the present disclosure the system further comprises a conduit or a container adapted to collect condensed water as it precipitates from the ambient air.

In one aspect of the present disclosure the pressurized gas source comprises air. In yet another one aspect, the system comprises a compressor configured to compress an ambient air stream into the pressurized gas source; and a renewable energy source configured to generate power from at least one of a windmill or moving air stream, a solar energy source, and a geothermal energy source, and wherein the generated power operates the compressor.

In another aspect, the present disclosure provides a system for providing turbine inlet-cooling for a power-generation facility, the system comprising: a pressurized fuel source configured to feed the turbine; an expander in fluid communication with the pressurized fuel source and configured to expand a portion of fuel from the pressurized fuel source to generate a cool expanded fuel; a heat exchanger configured to provide thermal contact between the cool expanded fuel and air to chill the air and warm the expanded fuel; a conduit configured to transfer the chilled air to an inlet of the turbine; optionally a compressor configured to pressurize the warm expanded fuel; and optionally a container or conduit configured to capture water as it precipitates from cooling the air.

In yet a further aspect, the present disclosure provides a method for providing turbine inlet cooling to a power-generating device fueled by a pressurized gas source, comprising: expanding a portion of gas from the pressurized gas source to generate a cooled gas; chilling a second gas or fluid via thermal contact with the cooled gas to generate a chilled second gas or fluid, and a warm gas; conveying the chilled second gas or fluid to an inlet of a turbine; and optionally recompressing the warm gas to at or about the same pressure as the pressurized gas source, wherein the second gas comprises humid air, and wherein water is precipitated and captured in a container or conduit upon cooling the humid air.

In yet another aspect, the method further comprises mixing the chilled air with ambient air; delivering a combined stream of chilled and ambient air to the inlet of the turbine; and capturing water precipitated from the ambient air upon mixing with the chilled air, wherein the combined stream of chilled and ambient air is at or below 59 degrees Fahrenheit at the turbine inlet.

In yet another aspect, the method further comprises mixing the chilled air with ambient air, wherein the ambient air is at or greater than 95 degrees Fahrenheit prior to mixing with the chilled air; delivering a combined stream of chilled and ambient air to the inlet of the turbine; and capturing water precipitated from the ambient air upon mixing with the chilled air, wherein the combined stream of chilled and ambient air is at or below 70 degrees Fahrenheit at the turbine inlet.

BRIEF DESCRIPTION OF DRAWINGS

FIG. 1 is a schematic diagram of a TIC system according to one representative embodiment of the invention.

DETAILED DESCRIPTION OF PREFERRED EMBODIMENTS

Figure 2:
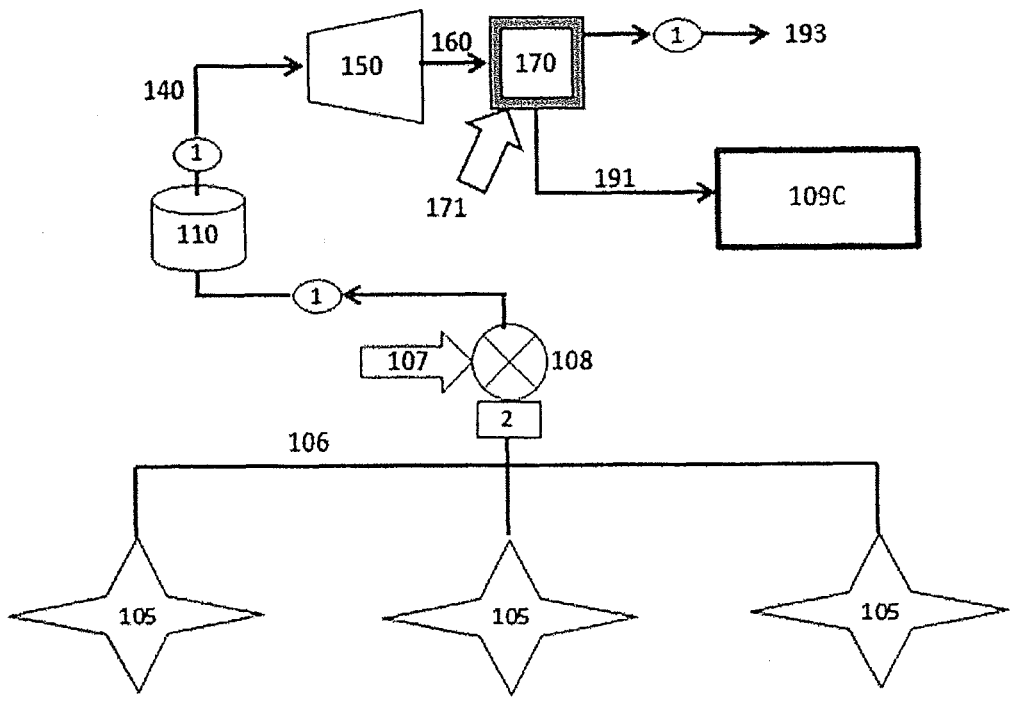
FIG. 2 is a schematic diagram of a cooling system utilizing renewable energy according to another representative embodiment of the invention.

Typically, power-generation facilities are located within proximity to a pressurized fuel source, which feeds the power-generating devices. For example, combustion turbines may be fed by a natural gas pipeline. A power-generation facility may be any system or device capable of generating electricity, for example, a cogeneration facility, a trigeneration facility, or a polygeneration facility, a system of one or a plurality of fuel fed combustion turbines, or any other system or device capable of utilizing the effects, benefits, and/or enhanced efficiency of inlet-cooling. Inlet-cooling, as discussed herein, may be applied via a chilled gas or fluid directly to each fuel-fed combustion turbine, or may be fed into an inlet of a system that subsequently apportions and/or introduces inlet cooling to each combustion turbine.

Referring to FIG. 1, in one embodiment of the invention, a system for providing chilled gas or fluid includes a pressurized gas source 110, an expander 150, a heat exchanger 170, an air-mixing unit 180, a power-generating facility 130 or other apparatus to be cooled, and a compressor 1010. The present embodiment utilizes expansion of a portion of the gas from pressurized gas source 110 to chill a second gas or liquid stream 171 to provide a chilled gas or fluid stream 172. The second gas or liquid may be the same type of gas or chemical composition as in the pressurized gas source, or may comprise a different composition.

Power-generating facility 130, including at least one combustion turbine, is preferably located nearby and fueled by pressurized gas source 110. The gas source 110 may be, for example, a pipeline or other pressurized flow of gas, a pressurized storage of gas in a container or well, or a gas production facility capable of delivering fuel gas to the power-generating facility 130. Gas source 110 may also be, for example, a storage vessel such as a tank, an above or below grade storage vessel, or a storage vehicle such as a tank truck. In a specific embodiment, the gas source 110 is a well bore converted into a gas storage system as disclosed in U.S. Pat. No. 6,840,709, the disclosure of which is hereby incorporated by reference herein in its entirety.

With reference to FIG. 1, pressurized fuel stream 120 from gas source 110 may feed directly to the power-generating facility 130, more specifically, to a fuel-fed turbine capable of generating electric power.

In general, any suitable amount or portion of the pressurized gas source 110 may be diverted via conduit 140 to the cooling systems herein described. Typical amounts may range from about 0.1 mcf/day to 750,000 mcf/day, about 50,000 mcf/day to 300,000 mcf/day, and more particularly from about 150,000 mcf/day to 250,000 mcf/day. The amounts may vary depending on the size of the apparatus requiring cooling, the electricity production capacity of the power-generating facility, and the number of fuel-fed combustion turbines within the facility. Gas source 110 may contain any pressurized gas capable of reducing temperature during expansion, such as air, nitrogen, oxygen, propane, methane or natural gas. In certain preferred embodiments, the gas is natural gas. Gas source 110 may be at any suitable pressure, for example, about 50 psia to 5,000 psia, about 500 psia to 3,000 psia, and in a specific aspect, about 200 psia to 1,000 psia.

Expander 150 is configured to receive and expand at least a portion of the gas from the gas source 110 via conduit 140. The expander 150 may be any suitable expander including, but not limited to, a turbo-expander. A turbo-expander can result in efficient cooling together with generation of additional electrical power through energy capture from the expanding gas. For example, a turbo-expander operating with an inlet flow rate of 180,000 mcf/day, inlet temperature and pressure of 50° F. and 700 psig, and with outlet temperature and pressure of −261° F. and 35 psig, can generate approximately 8.4 MW. Expansion from pressures greater than 700 psig is also possible to reduce cooling temperatures even further.

The de-pressurized and cool expanded gas stream 160 is introduced to an inlet of a heat exchanger 170, which is adapted to transfer a cooling effect from the cool expanded gas stream 160 to chill a second gas or liquid stream 171. The heat exchanger 170 may be, for example, an air house, absorption chiller, cooling pool, or any other conductive and/or convective apparatus capable of transferring heat between two potentially multi-phase streams, and preferably obtaining thermal equilibrium between the two streams. The second gas or liquid stream 171 may be any heat-exchange media suitable for use in the systems herein described, and typically comprises ambient air or other gasses capable of safe use within a power-generating facility. In certain embodiments, this may be an inert gas such as nitrogen, to provide a chilled inert gas to the apparatus to be cooled. Heat exchanger 170 places the cool expanded gas stream 160 in thermal contact with the second gas or liquid stream 171, thereby generating a warm expanded gas stream 173 and a chilled second gas or fluid stream 172. Due to the various temperature changes possible within the heat exchanger 170, any or all streams may contain gaseous and/or liquid media, as appropriate or desired for specific applications. For example, as discussed herein, second gas or liquid stream 171 can be ambient humid air, in which case chilled gas or fluid stream 172 is chilled air from which has precipitated condensed water, thus generating fresh water as an additional advantage. Water can be generated in significant quantities and made available for a variety of uses within the power-generating facility or for other uses as further discussed below.

Conduit system 175 is configured to transport the chilled second gas or fluid stream to the apparatus to be cooled, typically a power-generating facility 130, and specifically, a fuel-fed power-generating turbine inlet. Conduit system 175 may be, for example, a piping system configured to receive and transport the liquid or gaseous stream 172 from the heat exchanger 170 directly to the apparatus to be cooled. Conduit system 175 may further include or be in fluid communication with an additional apparatus, for example, an air-mixing unit 180, to further enhance the intake mass and operational efficiency of the apparatus to be cooled. Additionally, in certain embodiments, the conduit system 175 may further include or be used in conjunction with other TIC systems.

Compressor 1010 recompresses the warm expanded gas stream 173 to re-pressurize the gas to, for example, at or near the pressure of gas source 110. Any suitable compressor may be used, including a gas fired turbine, a reciprocating turbine, or an electric compressor. The compressed return gas stream 174 may be reintroduced to the gas source 110 at approximately the same or at a different location than the location where the pressurized gas stream 140 was diverted from the gas source 110. Compressor 1010 may also be used to transfer the recompressed gas to a different source, container, tank, or to another apparatus for storage or requiring compressed gas. Pipeline transfer and compressor energy requirements are more than offset by improved TIC efficiency and power-generation gains using the systems described herein. Preferably, gas source 110, expander 150, heat exchanger 170, and power-generating facility 130 and associated turbine inlet are all located within a circumference of 0.15 to 20 miles, 0.25 to 10 miles, or 0.5 to 5 miles, or less. Chilled inlet-cooling fluid stream 181 from optional air-mixing unit 180 to the power-generation facility 130 may be the chilled second gas or fluid stream 172 directly from the heat exchanger, or it may be generated from further combinations of the chilled second gas or fluid stream 172 with ambient air or other streams. The cooling effect from expander 150/heat exchanger 170 may also be utilized to cool any other apparatus and/or to produce fresh water as described herein.

The chilled second gas or fluid stream 172 may be further combined with an air stream 190 in air-mixing unit 180 to generate a chilled inlet-cooling fluid stream 181. In a particular embodiment, the chilled inlet-cooling fluid stream 181 may have any suitable volumetric flow rate, such as from about 36,000 mcf/hr to about 180,000 mcf/hr, or from about 36,000 mcf/hr to about 90,000 mcf/hr. The system may have a much larger or smaller volumetric flow as needed by the apparatus to be cooled, or as limited by the volume of the gas source 110. Inlet-cooling fluid stream 181 may be introduced to the turbine inlet or other apparatus at any temperature cooler than ambient temperature, including a temperature at or below about 75° F., at or below about 70° F., from about 0° F. to 75° F., about 0° F. to 70° F., about 0° F. to 59° F., or about 20° F. to 42° F., and at any suitable pressure, including about 14.7 psia to 30 psia, or 14.7 psia to 20 psia, where ambient temperatures are any temperature, including, such as at or over 100° F., about 85° F. to 110° F., 95 to 110° F., or 90° F. to 105° F.

Air-mixing unit 180 may be configured to combine two gaseous streams or one or more multi-phase liquid/gaseous streams; additionally, it may be located within an evaporative cooling tower. Air-mixing unit 180 may also be combined with a compressor suitable for compressing air stream 190, chilled second gas or fluid stream 172, and/or chilled inlet stream 181, to any desired inlet pressure for the inlet of the turbine(s) within the power-generating facility 130 or other apparatus to be cooled.

While unnecessary for obtaining highly efficient operation, if desired, the systems and methods described herein also may be combined with other TIC systems for reducing the temperature of the inlet-cooling fluid stream 181. Such systems may include an evaporative cooler or absorption cooler. For example, the second gas or liquid stream 171 may be, in part, cooled by one or both of such cooling methods prior to introduction into the heat exchanger 170, or such methods may be included in conduit system 175 and applied to either the air stream 190 or the chilled second gas or fluid stream 172 prior to introduction into the air-mixing unit 180 cooling.

A further embodiment provides chilled gas or fluid to a building to increase energy efficiency within the building. This system generates a chilled inlet-cooling gas or fluid stream 181 as described above; however, the apparatus to be cooled comprises the air conditioning system of a building, locations of a building, or other structure requiring cooling, for example a TES system. Such embodiments are effective to achieve industrial, commercial, or residential building energy efficiency requirements, thereby reducing operating costs and meeting green building requirements. This building cooling embodiment may be used in combination with inlet-cooling, in conjunction with water generation, or as a stand-alone system. The pressurized gas source 110 need not be a gaseous fuel, which is typically preferred herein for TIC systems.

The systems and methods described herein may further include control systems and apparatus, which may be used in any suitable manner. For example, referring to FIGS. 1 and 2, flow control valves 1 may be incorporated to manage the flow rates and pressures of the respective streams. The flow control valves 1 are optionally configured to control the overall system, and therefore are diagramed throughout the system. The flow control valves 1 may be automated or manual control values as utilized in the field. Additional flow values may be utilized as needed. While all flow control valves are illustrated by reference element 1, any of these valves may further include pressure relief values, flow rate sensors, and/or any other suitable control mechanisms. The system may further include an automated control system for meter and regulation control, for example, a SCADA (Supervisory Control and Data Acquisition) system to permit automated direction of all valves, meters, sensors and controllers through use of industry telemetry equipment 2. While automated control is preferred, manual control systems may alternatively or conjunctively be utilized, as suitable in the field.

Referring to FIGS. 1 and 2, various embodiments of the present invention generate fresh water by condensing the humidity or water vapor from the second gas or liquid stream 171 and/or ambient air stream 190. Such embodiments may include a pressurized gas source 110, an expander 150, a heat exchanger 170, a conduit or conduit system 175, and optionally an air mixing unit 180 as described above. Water generation embodiments are useful for all locations, but are uniquely advantageous in humid ambient air locations, and can be combined with any and all cooling systems and methods described herein where the gas stream to be cooled contains water vapor or humidity, preferably ambient air. Air is readily available at virtually all facilities and frequently contains significant quantities of water vapor, i.e., relative humidity, at temperatures that are far too high for efficient turbine operation as determined by, for example, ISO ratings. The ambient air and cool fluid stream in water generation embodiments may be the same as for inlet-cooling described above.

Water generation systems and methods herein may utilize a pressurized gas source 110, from which a pressurized gas stream 140 is de-pressurized by an expander 150. The pressurized gas source 110 may contain any type of gas and include any apparatus containing the gas, including, but not limited to, compressed air generated from energy produced by a windmill or other renewable energy source into a distributed storage area such as a converted well bore. Thus, in an embodiment whereby the pressurized gas source is compressed air, the compressed air may be ambient air that is compressed into the pressurized gas source, or the compressed air may be a source of pressurized air introduced to the pressurized gas source, as needed, particularly during times of high wind, for storage for use during zero or calm wind conditions.

The cool expanded gas stream 160 is placed in thermal communication with a second gas or liquid stream 171 in heat exchanger 170. The second gas or liquid stream 171 is preferably ambient air. When the second gas or liquid stream 171 is ambient air, chilling of the second gas or liquid stream 171 in the heat exchanger 170 and/or subsequently in air-mixing unit 180 causes condensation of the water vapor in the ambient air and generates precipitation. For example, ambient air at 14.7 psia and 60% RH (relative humidity) and 80° F. will retain 0.108 gallons of water per mcf, while air at 14.7 psia, 75% RH, and 90° F. will also retain 0.180 gallons of water per mcf. Operating a heat exchanger, for example, to reduce relative humidity and ambient air temperature from 75% RH and 90° F., to 60% RH and 80° F., with an air flow rate of 180,000 mcf/hr, can therefore generate approximately 12,960 gallons of water per hour. Moreover, this water generation can be performed using the above systems and methods in conjunction with simultaneous TIC of, for example, a 500 MW power-generation facility, or the cooling of any other apparatus as desired.

Fresh water is generated from the condensation of water vapor in the second gas or liquid steam 171 during cooling via heat exchanger 170. This embodiment may further include a chilled second gas or fluid stream 172 to cool an ambient air stream 190 within air-mixing unit 180, thereby condensing additional water from the ambient air stream 190 and forming precipitation for storage in a water storage unit. Any suitable air-mixing unit may be utilized to combine streams 171, 172, and/or 180. Upon combination of the streams, chilled inlet-cooling fluid stream, such as 181, can also be generated. This stream may also comprise fresh water and/or chilled air. The chilled inlet-cooling stream may be applied to any apparatus desired to be cooled.

In a specific embodiment, referring to FIG. 1, fresh water streams 400 and 401 from condensation of water vapor in or subsequent to heat exchanger 170, are directed to water storage facility 402. Water storage facility 402 may be any suitable water storage or transfer system, container, or apparatus. Water from water storage facility 402 may be utilized for any suitable purpose. In a specific embodiment, a fresh water stream 403 may be incorporated to return fresh water to conduit system 175. For example, fresh water stream 403 may be utilized for conventional TIC to cool air stream 190.

Referring to FIG. 2, in a specific embodiment, subsequent to heat exchanger 170, precipitated water is directed to water storage facility 109C via precipitation stream 191. Cooling stream 193 comprises the cooled gaseous media of second gas or liquid stream 171, and may be directed for use in any apparatus to be cooled as herein described.

The fresh water may be used for municipal water supply, agriculture, fracking, or any other uses. Water storage units 109C and 402 may be any suitable water storage holding tank/pool, silo, water tower, water transportation vehicle, well, conduit, lake, or similar water storage or water transportation apparatus. Pumps (not shown) may pump the generated fresh water stream to other locations for multiple purposes.

Referring again to FIG. 2, in a specific illustrative water generation embodiment, the pressurized gas source 110 may be generated by compressing gas utilizing renewable energy to power an electric compressor. As illustrated, this embodiment includes a wind farm energy source 105 to power compressor 108. As such, compressor 108 is connected to the gas source 110 and configured to compress available gas stream 107 into the gas source 110, which may be, for example, a converted well bore containing compressed air, which is then utilized as the pressurized gas source 110 as described above. This embodiment may use any gas, but compressed air possesses certain economic and other advantages. The pressurized gas in gas source 110 may be compressed by the compressor 108 to any suitable pressure, including approximately 700 psia to 3,000 psia. The energy source 105 may include a wind turbine, solar cell array, geothermal energy, or any fossil fuel or renewable energy source. These sources may additionally provide power-generation to the energy grid when energy is not required by compressor 108.

Having described certain embodiments of systems and methods for cooling, such as for increasing efficiency of power-generating devices and corresponding fuel sources, and having shown illustrative details of particular embodiments, it will be understood that the specific examples given are employed in a descriptive sense only, and are not for the purpose of limitation. Various modifications to the embodiments may be made without departing from the spirit and scope of the present invention, which is limited only by the appended claims. For example, the pressurized gas source need not comprise a gaseous fuel in all embodiments and may be ambient air or other compressible material, and the various materials to be cooled through either expansion or in heat exchange systems or mixing units may constitute gas from the pressurized gas source, but may also constitute or comprise second, third, or subsequently introduced gases, liquids, or other materials capable of carrying or transferring a cooling effect to another gas, liquid, material, or apparatus. Moreover, the pressurized gas source and/or second, third or subsequently introduced gases, liquids, or other materials may be provided by existing infrastructure, or by newly produced infrastructure or distributed storage facilities, such as converted well bores, underground caverns, storage containers, or tank transport systems or devices. And, while water generation is illustrated herein in part as an adjunct to cooling apparatus embodiments, and enhancing power-generation efficiency and thus electricity output, it also is contemplated that generating fresh water may be a direct or primary goal in some cases; in other cases, fresh water might not be collected and recovered for use, and yet still provide a significant advantage over other systems and methods that instead consume water.

What is claimed as new and desired to be protected by Letters Patent is:

1. A system for connecting to a pressurized gas source, and cooling an apparatus and/or generating water, the system comprising:
   a natural gas line for transmitting pressurized natural gas from the pressurized gas source;
   an expander in fluid communication with the natural gas line and configured to expand at least a portion of the pressurized natural gas to provide a cooled natural gas;
   a heat exchanger in thermal contact with the cooled natural gas and configured to place the cooled natural gas in thermal contact with a second gas or fluid to provide a chilled second gas or fluid, wherein the chilled second gas or fluid comprises air;
   a compressor configured to recompress at least a portion of the cooled natural gas after passage through the heat exchanger to produce compressed gas;
   an exit line configured to transport the compressed gas from the system; and
   optionally a conduit configured to transport the chilled second gas or fluid to an apparatus to be cooled;
   wherein the chilled second gas or fluid is chilled to at or below 59 degrees Fahrenheit; wherein a single phase gaseous material exits the expander.

2. The system of claim 1, wherein the chilled second gas or fluid comprises air.

3. The system of claim 2, wherein the air comprises water vapor.

4. The system of claim 3, further comprising a conduit or a container adapted to collect condensed water as it precipitates from the air.

5. The system of claim 1, further comprising a conduit configured to transport the chilled second gas or fluid to an apparatus to be cooled, wherein the as apparatus comprises a ventilation or air conditioning system of a building.

6. The system of claim 1, further comprising a conduit configured to transport the chilled second gas or fluid to an apparatus to be cooled, wherein the apparatus to be cooled comprises a power generating turbine.

7. The system of claim 6, wherein the power generating turbine is fueled by gas from the pressurized gas source.

8. The system of claim 1, wherein the pressurized gas source comprises at least one of a gas pipeline, a gas storage tank, and a well bore.

9. The system of claim 8, wherein the pressurized gas source comprises a natural gas pipeline.

10. The system of claim 1, wherein the heat exchanger comprises at least one of an air house, an absorption chiller, and a cooling tower.

11. The system of claim 1, further comprising at least one of an evaporative cooler and absorption cooler in thermal contact with at least one of the second gas or fluid and the chilled second gas or fluid.

12. The system of claim 1, further comprising an air mixing unit configured to mix the chilled second gas or fluid with ambient air.

13. The system of claim 12, further comprising a conduit or a container adapted to collect condensed water as it precipitates from the ambient air.

14. The system of claim 1, further comprising:
a renewable energy source configured to generate power from at least one of a windmill or moving air, a solar energy source, and a geothermal energy source to operate the compressor.

15. The system of claim 1, wherein the chilled second gas or fluid comprises a chilled fluid.

16. The system of claim 1, further comprising a conduit or container configured to transport the chilled second gas or fluid to an apparatus to be cooled.

17. The system of claim 16, wherein the chilled second gas or fluid is a fluid.

18. The system of claim 1, wherein the pressurized gas source comprises an existing or newly developed infrastructure or distributive storage facility.

19. A system for providing turbine inlet-cooling for a power-generation facility, the system comprising:
a pressurized fuel source configured to feed a turbine;
an expander in fluid communication with the pressurized fuel source and configured to expand a portion of fuel from the pressurized fuel source to generate a cool expanded fuel;
a heat exchanger configured to provide thermal contact between the cool expanded fuel and air to provide chilled air and warmed fuel;
a conduit configured to transfer the chilled air to an inlet of the turbine;
optionally a compressor configured to pressurize the warmed fuel; and
optionally a container or conduit configured to capture water as it precipitates from cooling the air.

20. The system of claim 19, further comprising a conduit or container configured to collect water from the cooling air.

21. A method for providing turbine inlet cooling to a power-generating device fueled by a pressurized natural gas source having a first pressure, comprising:
expanding a portion of natural gas from the pressurized natural gas source to generate a cooled natural gas;
chilling a second gas or fluid via thermal contact with the cooled natural gas to generate a chilled second gas or fluid, and a warm gas;
conveying the chilled second gas or fluid to an inlet of a turbine; and
optionally recompressing the warm gas to at or about the first pressure of the pressurized natural gas source,
wherein the second gas or fluid comprises humid air, and wherein water is precipitated and captured in a container or conduit upon cooling the humid air.

22. The method of claim 21, further comprising:
mixing the chilled second gas or fluid with ambient air;
delivering a combined stream of chilled second gas or fluid and ambient air to the inlet of the turbine; and
capturing water precipitated from the ambient air upon mixing with the chilled second gas or fluid,
wherein the combined stream of chilled second gas or fluid and ambient air is at or below 59 degrees Fahrenheit at the inlet of the turbine.

23. The method of claim 21, further comprising:
mixing the chilled second gas or fluid with ambient air, wherein the ambient air is at or greater than 95 degrees Fahrenheit prior to mixing with the chilled second gas or fluid;
delivering a combined stream of chilled second gas or fluid and ambient air to the inlet of the turbine; and
capturing water precipitated from the ambient air upon mixing with the chilled second gas or fluid,
wherein the combined stream of chilled second gas or fluid and ambient air is at or below 70 degrees Fahrenheit at the inlet of the turbine.

* * * * *